Patented Dec. 30, 1947

2,433,393

UNITED STATES PATENT OFFICE 2,433,393

DICYANDIAMIDE MALEATE

Joseph H. Paden and Alexander F. MacLean, Stamford, Conn., assignors to American Cyanamid Company, New York, N. Y., a corporation of Maine No Drawing. Application October 25, 1945, Serial No. 624,580

4 Claims. (Cl. 260—501)

This invention relates to the maleate salts of dicyandiamide and to methods of preparing the same.

It has been recorded in the literature that dicyandiamide, a neutral compound having a low ionization constant would not form salts with acids in aqueous solutions. In spite of this argument which refutes the formation of such salts it has now been discovered that maleate salts of dicyandiamide can be prepared.

The maleate salts are prepared by reacting dicyandiamide with maleic acid in a solvent for either or both of the reactants. Typical solvents are ethers, esters, ketones, acids, and the like.

The following example will serve to illustrate the preparation of a maleate salt of dicyandiamide:

EXAMPLE

*Preparation of dicyandiamide acid maleate*

| Reagents | Molar Ratio |
|---|---|
| Dicyandiamide | 1.00 |
| Maleic acid | 0.95 |
| Water | 7.00 |
| Acetone | 6.90 |

The maleic acid is added carefully to the mechanically stirred aqueous acetone solution of the dicyandiamide at room temperature and a precipitate forms. After cooling to 15° C., the colorless crystals are filtered, washed with methyl ethyl ketone and dried under vacuum. By means of a potentiometric titration the molecular weight was found to agree closely with the theoretical value of 200.

Dicyandiamide acid maleate does not have a sharp melting or decomposition point, and since the analytical data checks the theoretical composition, the optical and crystallographic properties are presented herein in order to characterize the maleate. Dicyandiamide acid maleate is a white, equant solid which crystallizes in the monoclinic system, has a form $(hkl)$, occurs as hemibipyramids, and has a negative optic sign. In white light the refractive indices are as follows: $\alpha=1.390$; $\beta=1.692$; and $\gamma=1.700$. The apparent optic axial angle as observed in air is 29°, and the true optic axial angle calculated therefrom is 17°. The optic axial plane or principal optic section is perpendicular to the (010) plane. The principal vibration directions are as follows: $\alpha$ is parallel to "b" but $\gamma$ is at an angle to "c." It is to be understood that the crystallographic symbols "b," and "c" refer to optic axes.

The maleate salt of dicyandiamide is useful as chemical intermediates in the preparation of flameproofing compositions, chemotherapeutic agents, insecticides, synthetic resins and for other purposes.

While the invention has been described with particular reference to specific embodiments, it is to be understood that it is not to be limited thereto, but is to be construed broadly and restricted solely by the scope of the appended claims.

What is claimed:

1. Dicyandiamide acid maleate.
2. A method of preparing dicyandiamide acid maleate which includes reacting dicyandiamide with maleic acid below substantially 30° C.
3. A method of preparing dicyandiamide acid maleate which includes reacting dicyandiamide with maleic acid in an organic solvent for the dicyandiamide and the maleic acid below substantially 30° C.
4. A method of preparing dicyandiamide acid maleate which includes the steps of reacting in maleate which includes the steps of reacting in aqueous acetone dicyandiamide with maleic acid in a molar ratio of substantially 1:1 below substantially 30° C., and recovering dicyandiamide acid maleate therefrom.

JOSEPH H. PADEN.
ALEXANDER F. MacLEAN.

REFERENCES CITED

The following references are of record in the file of this patent:

UNITED STATES PATENTS

| Number | Name | Date |
|---|---|---|
| 1,939,365 | Piccard | Dec. 12, 1933 |
| 2,131,127 | Ter Horst | Sept. 27, 1938 |
| 2,223,935 | Daniels et al. | Dec. 3, 1940 |
| 2,265,942 | Hill | Dec. 9, 1941 |
| 2,323,869 | Jayne et al. | July 6, 1943 |
| 2,364,594 | Thurston et al. | Dec. 5, 1944 |

FOREIGN PATENTS

| Number | Country | Date |
|---|---|---|
| 332,681 | Germany | Jan. 27, 1921 |

OTHER REFERENCES

Hoag, Liebigs Annalen, vol. 122, pp. 29 and 30, 1862.

Davis, Jour. Am. Chem. Soc., vol. 43, pp. 2232–2233, 1921.

Davis, Jour. Am. Chem. Soc., vol. 43, p. 669, 1921.